(12) United States Patent
Liao et al.

(10) Patent No.: US 11,695,156 B2
(45) Date of Patent: Jul. 4, 2023

(54) ADDITIVES FOR LITHIUM BATTERIES AND METHODS

(71) Applicant: UCHICAGO ARGONNE, LLC, Chicago, IL (US)

(72) Inventors: Chen Liao, Westmont, IL (US); Ilya A. Shkrob, Chicago, IL (US); Daniel Abraham, Bolingbrook, IL (US); Zhengcheng Zhang, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 352 days.

(21) Appl. No.: 17/074,311

(22) Filed: Oct. 19, 2020

(65) Prior Publication Data
US 2021/0043975 A1 Feb. 11, 2021

Related U.S. Application Data

(62) Division of application No. 16/175,497, filed on Oct. 30, 2018, now Pat. No. 10,847,840.

(51) Int. Cl.
*H01M 10/0567* (2010.01)
*H01M 10/0569* (2010.01)
(Continued)

(52) U.S. Cl.
CPC ....... *H01M 10/0567* (2013.01); *H01M 4/587* (2013.01); *H01M 10/0525* (2013.01); *H01M 10/0569* (2013.01); *H01M 2300/0037* (2013.01)

(58) Field of Classification Search
CPC ............. H01M 4/587; H01M 10/0525; H01M 10/0567; H01M 10/0568; H01M 10/0569; H01M 2300/0037
See application file for complete search history.

(56) References Cited

U.S. PATENT DOCUMENTS

| | | | |
|---|---|---|---|
| 2011/0183219 A1 | 7/2011 | Mitsui et al. | |
| 2015/0118537 A1* | 4/2015 | Obasih | H01M 50/209 |
| | | | 429/120 |

(Continued)

FOREIGN PATENT DOCUMENTS

| | | | | |
|---|---|---|---|---|
| KR | 10-2013-0102969 A | * | 9/2013 | ............. C01B 25/10 |
| KR | 1020130102969 B1 | | 9/2013 | |

(Continued)

OTHER PUBLICATIONS

KR 10-2013-0102969 A machine English translation (Year: 2013).*

(Continued)

*Primary Examiner* — Ula C Ruddock
(74) *Attorney, Agent, or Firm* — Olson & Cepuritis, Ltd.

(57) ABSTRACT

Lithium tetrafluoro(malonato)phosphate compounds are useful as additives in lithium ion battery applications. The compounds are represented by Formula (I): $MPF_4[-O(C=O)-(CX'X'')-(C=O)O-]$; wherein M is Li or Na; each X' and X'' independently is selected from the group consisting of H, alkyl, fluoro-substituted alkyl, and F; or wherein the X' and X'' together are $-CR_2-(CR'_2)_m-CR''_2-$; each R, R' and R'' independently is selected from the group consisting of H methyl, trifluoromethyl, and F; and in is 0 or 1. These compounds can be prepared in high purity and a high yield by reaction of a metal hexafluorophosphate with a bis-silyl malonate compound. A similar oxalato compound, lithium tetrafluoro(oxalato)phosphate), can be made in the same manner, but using a bis-silyl oxalate in place of the bis-silyl malonate. Advantageously, the compounds can be formed, in situ, in a $LiPF_6$-containing electrolyte solution.

19 Claims, 3 Drawing Sheets

(51) Int. Cl.
H01M 4/587 (2010.01)
H01M 10/0525 (2010.01)

(56) References Cited

U.S. PATENT DOCUMENTS

2017/0092987 A1* 3/2017 Haga ............... H01M 10/0585
2017/0222264 A1* 8/2017 Morinaka ........... H01M 10/052

FOREIGN PATENT DOCUMENTS

KR 10-2013-0102969 A * 10/2013
KR 1013956630000 B1 5/2014

OTHER PUBLICATIONS

Abe, K. et al., Nonaqueous Electrolytes and Advances in Additives, Electrolytes For Lithium and Lithium-Ion Batteries 3, T.R. Jow et al., 167-182 (2014).
Abraham, D.P. et al., Performance of High-Power Lithium-Ion Cells Under Pulse Discharge and Charge Conditions, International Journal of Energy Research 34, 190-203 (2010).
Bloom, I., et al., An Accelerated Calendar and Cycle Life Study of Li-Ion Cells, Journal of Power Sources 101, 238-247 (2001).
Kim et al., AB Initio Study of the Operating Mechanisms of tris(trimethylsilyl) Phosphite As A Multifunctional Additive For Li-Ion Batteries; Journal of Power Sources, vol. 355, 154-163 (2017).
Liao, C. et al., Synthesis and Characterization of Lithium Bis(fluoromalonato) Borate For Lithium-Ion Battery Applications, Adv. Energy Mater. 4, 1301368, 1-12 (2014).
Long, B. R. et al., Enabling High-Energy, High-Voltage Lithium-Ion Cells: Standardization of Coin-Cell Assembly, Electrochemical Testing, and Evaluation of Full Cells, Journal of the Electrochemical Society 163 (14), A2999-A3009 (2016).
Qi, X et al., Lifetime Limit of Tris(trimethylsilyl) Phosphite As Electrolyte Additive For High Voltage Lithium Ion Batteries, RSC Adv. 6, 38342-38349 (2016).
Wan, S. et al., A Stable Fluorinated and Alkylated Lithium Malonatoborate Salt For Lithium Ion Battery Application, Chem. Common. 51, 9817-9820, (2015).

* cited by examiner

ADDITIVES FOR LITHIUM BATTERIES AND METHODS

CROSS-REFERENCE TO RELATED APPLICATIONS

This application is a division of U.S. application Ser. No. 16/175,497, filed on Oct. 30, 2018, which is incorporated herein by reference in its entirety.

STATEMENT OF GOVERNMENT INTEREST

This invention was made with government support under Contract No DE-AC02-06CH11357 awarded by the United States Department of Energy to UChicago Argonne, LLC, operator of Argonne National Laboratory. The government has certain rights in the invention.

FIELD OF THE INVENTION

This invention relates to materials that are useful as additives for lithium-based electrochemical cells and batteries.

BACKGROUND

Rechargeable batteries are increasingly used for a variety of energy storage applications. While, lithium ion (Li-ion) batteries remain a very important commercial and research focus, there is an increasing need for new battery technologies to provide better cycling and less capacity loss than the Li-ion.

Lithium ion batteries (LIB) have high energy and power densities and are the main energy storage form for both portable electronics and electric vehicles. Although LIB has been commercialized since 1991, layered metal oxide materials such as $LiMO_2$ (where M=Co, Ni, Mn) are still the cathode materials of choice for commercial batteries. Composite $LiNi_xMn_yCo_zO_2$ (x+y+z=1; also commonly known as "NMC") metal oxides have been promising materials for LIB cathode applications since the electrochemistry of the electrode can be tailored by the changes in the oxide composition: higher nickel contents in the composition (NMC811; i.e., $LiNi_xMn_yCo_zO_2$ having a Ni:Mn:Co atomic ratio of 8:1:1) will generally allow for higher capacities, but at the cost of lower safety compared to a lower nickel content materials (NMC111). The electrolyte composition and any additives that may be included in the electrolyte play a vital role in the performance, as they are responsible for the formation of Solid Electrolyte Interface (SEI) on the anode and Cathode Electrolyte Interface (CEI) on the cathode, i.e., the interface between the electrodes and the electrolyte. The term "additives" refers to components in the electrolyte that are present at relatively low concentrations, and which can ameliorate capacity loss, among other issues, by formation of passivating layers on an electrode (e.g., anode) surface that reduce impedance or prevent further decomposition of the electrolytes.

The active lithium in a full cell (such as a NMC532 (cathode)-Graphite (Gr, anode) cell) discussed in this context is stored inside the positive electrode (cathode). For the first few cycles, formation of the SEI occurs on the negative electrode (anode) and causes the active lithium loss (ALL), since the process is non-reversible. The quality of the SEI and/or CEI determines the capacity retention of a full cell, and improvement of SEI and/or CEI can be achieved through addition of a few percent by weight (wt %) of certain additive materials.

In order to reach high energy densities, high charging voltages are required for NMC materials, resulting in concomitant problems, including, e.g., electrolyte decomposition, which often is unavoidable at high voltages; and phase changes in the cathode materials. For high voltage (>4.4 V) applications, additives have been very efficient in both improving the capacity retention and reducing the impedance by mitigating unavoidable electrolyte decomposition reactions occurred both at anode and cathodes side during the charge/discharge process.

There is an ongoing need for new additive materials for LIB applications. The compositions and methods described herein address this need.

SUMMARY

In one aspect, new tetrafluoro(malonato)phosphate salts are described, which are useful as additives in lithium ion battery applications. The salts are represented by Formula (I): $MPF_4[-O(C=O)-(CX'X'')-(C=O)O-]$; wherein M is Li or Na (preferably Li); each X' and X" independently is selected from the group consisting of H, alkyl (e.g., $C_1$ to $C_4$ alkyl, such as methyl), fluoro-substituted alkyl (e.g., $C_1$ to $C_4$ alkyl substituted by one or more fluorine atoms, such as trifluoromethyl), and F; or wherein the X' and X" together are an alkylene group of formula: $-CR_2-(CR'_2)_m-CR''_2-$, each R, R' and R" independently is selected from the group consisting of H, methyl, trifluoromethyl, and F; and m is 0 or 1. These salts can be prepared in high purity and a high yield by reaction of a metal hexafluorophosphate ($MPF_6$) with a bis-silyl malonate compound of Formula (II): $Z_3Si-O(C=O)-(CX'X'')-(C=O)O-SiZ_3$; wherein each X' and X" independently is selected from the group consisting of H, alkyl, fluoro-substituted alkyl, and F; or wherein the X' and X" together are an alkylene group of formula: $-CR_2-(CR'_2)_m-CR''_2-$; each R, R' and R" independently is selected from the group consisting of H, methyl, trifluoromethyl, and F; m is 0 or 1; and each Z independently is alkyl (e.g., $C_1$ to $C_4$ alkyl, such as methyl) A similar oxalato compound: $MPF_4[-O(C=O)-(C=O)O-]$(a metal tetrafluoro(oxalato)phosphate), can be made in the same manner, but using a bis-silyl oxalate in place of the bis-silyl malonate. Scheme 1 illustrates typical exemplary syntheses of the lithium salts.

The tetrafluoro(malonato)phosphate salts of Formula (I), wherein M is Li, are effective additives for LIB, which can reduce cell impedance as well as improve the quality of SEI and CEI in lithium battery applications, e.g., in NMC532/Gr full cells. The salts can be formed at ambient room temperature by a simple mixing of $LiPF_6$ with a stoichiometric amount of a bis-trialkylsilyl di-carboxylate compound in an aprotic organic solvent. Electrolyte compositions comprising a lithium electrolyte salt and a lithium tetrafluoro(malonato)phosphate salt as an additive are also described herein.

Alternatively, metal tetrafluoro(oxalato)phosphate and the salts of Formula (I) can be formed in situ in an electrolyte composition comprising a stoichiometric excess of $MPF_6$ (M=Li or Na) by adding a bis-silyl oxalate or a bis-silyl malonate, respectively, to the $MPF_6$-containing electrolyte, such as 1 to 2 M $LiPF_6$ in an organic solvent (e.g., a carbonate solvent such as propylene carbonate (PC), ethylene carbonate (EC), dimethyl carbonate (DMC), ethyl methyl carbonate (EMC), or mixtures of two or more thereof). For example, a bis-silyl carboxylate ester of Formula (III): $(Z_3Si—O(C=O)—(CX'X'')_n—(C=O)O—SiZ_3$; wherein each X' and X" independently is selected from the group consisting of H, alkyl, fluoro-substituted alkyl, and F; or wherein the X' and X" together are an alkylene group of formula: $—CR_2—(CR'_2)_m—CR''_2—$; each R, R' and R" independently is selected from the group consisting of H, methyl, trifluoromethyl, and F; n is 0 or 1, m is 0 or 1, and each Z independently is alkyl (e.g., $C_1$ to $C_4$ alkyl, such as methyl), is added at a concentration of about 0.25 to about 5 percent by weight (wt %), preferably about 0.50 wt % to about 2 wt %, to LIB electrolyte compositions comprising 1 to 2 M $LiPF_6$ in an organic solvent (e.g., an organic carbonate solvent) to form the lithium tetrafluoro(malonato)phosphate active additive material, in situ. In some embodiments, the bis-silyl carboxylate ester is a compound of Formula (IV):

$(Z_3Si—O(C=O)—(C=O)O—SiZ_3$;

wherein each Z independently is alkyl (e.g., $C_1$ to $C_4$ alkyl, such as methyl), i.e., a compound of Formula (III) in which n is 0.

As a non-limiting example, the reaction between $LiPF_6$ and bis-trimethylsilyl oxalate (Compound 1a) is exothermic enough to proceed efficiently at room temperature (about 100% completion within two days) to generate lithium tetrafluoro(oxalato)phosphate ($LiPF_4[C_2O_4]$, Compound 2a), without applying an external heating source.

Similarly, a bis-silyl malonate (e.g., a bis-trimethylsilyl (TMS) malonate) can react, in situ, with $LiPF_6$ in an electrolyte solution to form a lithium tetrafluoro(malonato) phosphate. For example, Compound 2b ($LiPF_4[O(C=O) CFCH_3(C=O)O]$), was synthesized from $LiPF_6$ and bis-trimethylsilyl 2-fluoro-2-methyl malonate: (TMS-O(C=O) $CFCH_3(C=O)$O-TMS; Compound 1b). Both Compounds 2a and 2b afforded excellent results in LIB testing protocols in a typical NMC 532-graphite full cell. Two concentrations of 2a were found to exceed both the energy and power performance of a baseline cell lacking the additive

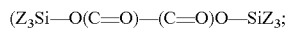

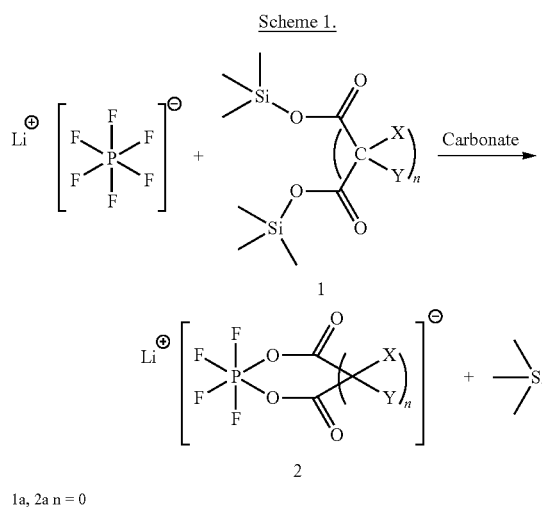

1a, 2a n = 0
1b, 2b X = F Y = CH$_3$ n = 1

The following non-limiting specific embodiments are enumerated below in order to illustrate certain features and aspects of methods described herein.

Embodiment 1 is a salt of Formula (I): $MPF_4[—O(C=O)—(CX'X'')—(C=O)O—]$; wherein M is Li or Na; each X and X' independently is selected from the group consisting of H, alkyl, fluoro-substituted alkyl, and F; or wherein the X' and X" together are an alkylene group of formula $—CR_2—(CR'_2)_m—CR''_2—$; each R, R' and R" independently is selected from the group consisting of H, methyl, trifluoromethyl, and F; and m is 0 or 1.

Embodiment 2 is the salt of Embodiment 1, wherein M is Li.

Embodiment 3 is the salt of Embodiment 1 or 2, wherein at least one of X' and X" is F.

Embodiment 4 is the salt of any one of Embodiments 1 to 3, wherein at least one of X' and X" is alkyl.

Embodiment 5 is the salt of any one of Embodiments 1 to 4, wherein at least one of X' and X" is $C_1$ to $C_4$ alkyl.

Embodiment 6 is the salt of any one of Embodiments 1 to 5, wherein X' is F and X" is methyl.

Embodiment 7 is an electrolyte for a lithium ion electrochemical cell, the electrolyte comprising a non-aqueous organic solvent containing a lithium electrolyte salt at a concentration of about 0.5 to about 3 M, and an additive at a concentration of about 0.25 to about 5 percent by weight (wt %); wherein the additive comprises a compound of Formula (I): $MPF_4[—O(C=O)—(CX'X'')—(C=O)O—]$; wherein M is Li; each X' and X" independently is selected from the group consisting of H, alkyl, fluoro-substituted alkyl, and F, or wherein the X' and X" together are $—CR_2—(CR'_2)_m—CR''_2—$; each R, R' and R" independently is selected from the group consisting of H, methyl, trifluoromethyl, and F; and in is 0 or 1.

Embodiment 8 is the electrolyte of Embodiment 7, wherein the lithium electrolyte salt comprises 1 to 2 M $LiPF_6$.

Embodiment 9 is the electrolyte of Embodiment 7 or 8, wherein the non-aqueous solvent comprises at least one organic carbonate solvent.

Embodiment 10 is the electrolyte of any one of Embodiments 7 to 9, wherein at least one of X and X' is F.

Embodiment 11 is the electrolyte of any one of Embodiments 7 to 10, wherein at least one of X and X' is $C_1$ to $C_4$ alkyl.

Embodiment 12 is the electrolyte of any one of Embodiments 7 to 11, wherein X' is F and X" is methyl.

Embodiment 13 is the electrolyte of any one of Embodiments 7 to 12, wherein the compound of Formula (I) is present in the electrolyte at a concentration in the range of about 0.5 to about 2 wt %.

Embodiment 14 is the electrolyte of any one of Embodiments 7 to 13, further comprising a silyl fluoride of formula $FSiZ_3$ wherein each Z independently is alkyl.

Embodiment 15 is a lithium electrochemical cell comprising a cathode, an anode, a lithium-porous separator between the cathode and the anode, and an electrolyte of any one of Embodiments 7 to 14 contacting the cathode and the anode.

Embodiment 16 is the electrochemical cell of Embodiment 15, wherein the cathode comprises a lithium nickel-manganese-cobalt oxide compound.

Embodiment 17 is the electrochemical cell of Embodiment 15 or 16, wherein the anode comprises graphite.

Embodiment 18 is the electrochemical cell of any one of embodiments 15 to 17, wherein the compound of Formula (I) is present in the electrolyte at a concentration in the range of about 0.5 to about 2 wt %, and wherein the electrolyte salt is $LiPF_6$.

Embodiment 19 is a battery comprising a plurality of the electrochemical cell of any one of Embodiments 15 to 18 electrically connected together.

Embodiment 20 is a method of preparing the electrolyte of any one of Embodiments 7 to 14, in which the lithium salt is $LiPF_6$, comprising the steps of adding a bis-silyl ester compound to a electrolyte containing the $LiPF_6$ in the non-aqueous organic solvent, and stirring the resulting mixture at ambient temperature for at least about 24 hours to form the salt of Formula (I), in situ, wherein the bis-silyl ester is a compound of Formula (II): $Z_3Si$—$O(C=O)$—$(CX'X'')$—$(C=O)O$—$SiZ_3$; wherein each X' and X'' independently is selected from the group consisting of H, alkyl, fluoro-substituted alkyl, and F; or wherein the X' and X'' together are —$CR_2$—$(CR'_2)_m$—$CR''_2$—; each R, R' and R'' independently is selected from the group consisting of H, methyl, trifluoromethyl, and F; m is 0 or 1; and each Z independently is alkyl.

Embodiment 21 is the method of Embodiment 20, wherein byproduct $FSiZ_3$ that is formed by the reaction of the $LiPF_6$ with the compound of Formula (II) is retained in the electrolyte.

Embodiment 22 is a method of preparing an electrolyte comprising a solution of the $LiPF_6$ in a non-aqueous organic solvent and an additive comprising a compound of Formula (V):

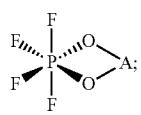

(V)

the method comprising the steps of adding a bis-silyloxy compound of Formula (VI):

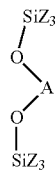

(VI)

to the solution of the $LiPF_6$ in the non-aqueous organic solvent, and stirring the resulting mixture at ambient temperature for at least about 24 hours to form the compound of Formula (V) in situ;
wherein
each Z independently is alkyl (e.g., methyl); and A is an organic moiety in which the O atoms of Formulas (V) and (VI) are separated by two or three carbon atoms, and each of the O atoms is bound to either a carbonyl carbon or an aromatic carbon.

Embodiment 23 is the method of Embodiment 22, wherein byproduct $FSiZ_3$ that is formed by the reaction of the $LiPF_6$ with the compound of Formula (VI) is retained in the electrolyte.

Embodiment 24 is the method of Embodiment 22, wherein byproduct $FSiZ_3$ that is formed by the reaction of the $LiPF_6$ with the compound of Formula (VI) is removed from the electrolyte by volatilizing the $FSiZ_3$.

DETAILED DESCRIPTION

Figure 1:
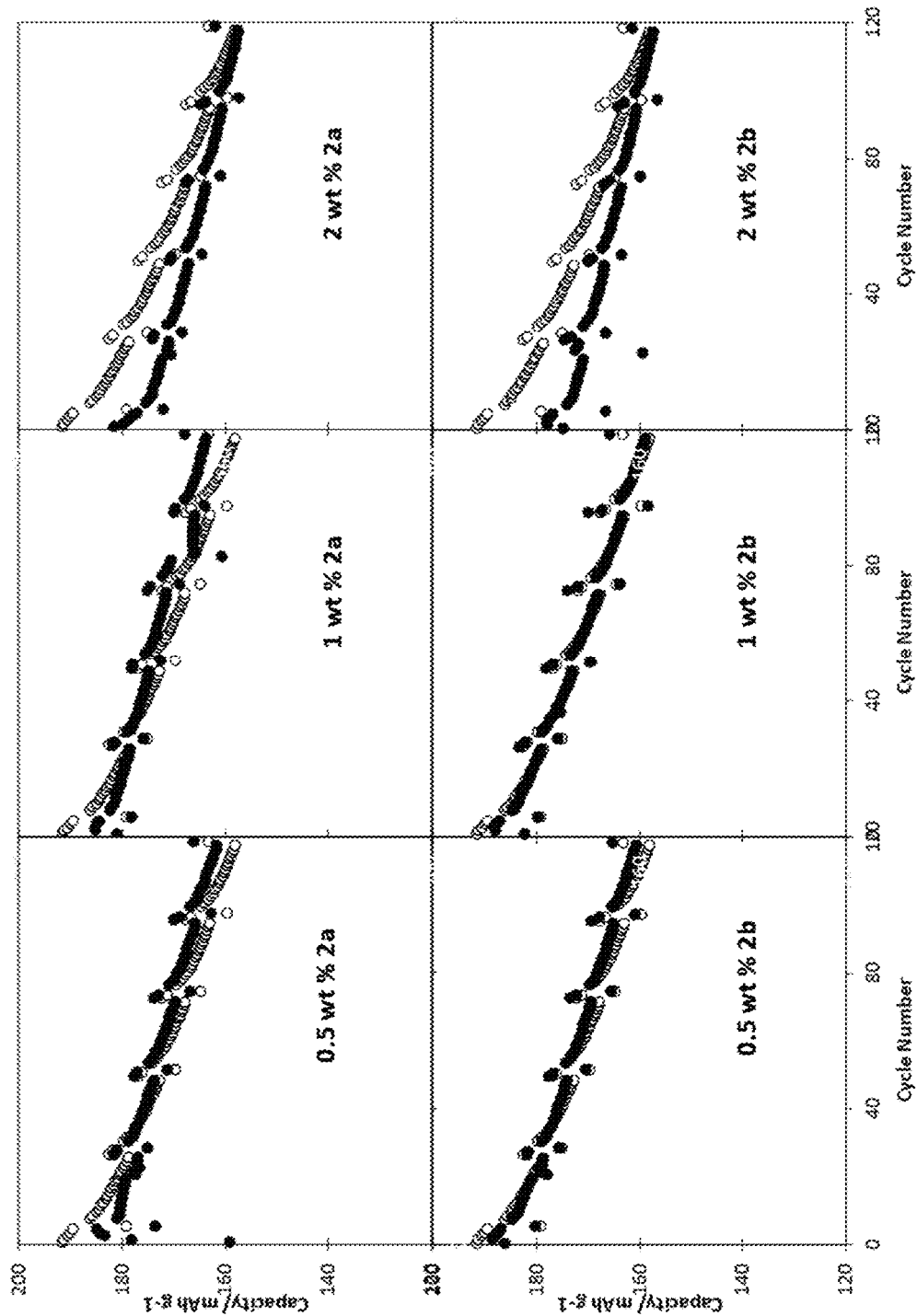
FIG. 1 provides plots of initial charge and discharge capacity for various concentrations of Compounds 2a and 2b (filled circles) in Gen 2 electrolyte with NMC532 cathode and graphite anode; open circles denote results from baseline Gen 2 electrolyte.

The lithium tetrafluoro(malonato)phosphate compounds disclosed herein are useful as additives in lithium ion battery applications. Compounds represented by Formula (I): $MPF_4$[—$O(C=O)$—$(CX'X'')$—$(C=O)O$—]; wherein M is Li or Na; each X' and X'' independently is selected from the group consisting of H, alkyl, fluoro-substituted alkyl, and F; or wherein the X' and X'' together are an alkylene group of formula —$CR_2$—$(CR'_2)_m$—$CR''_2$—; each R, R' and R'' independently is selected from the group consisting of H, methyl, trifluoromethyl, and F; and m is 0 or 1, are novel and effective additives for ameliorating capacity losses during cycling and reducing cell impedance. Using the addives in a $LiPF_6$ electrolyte can surprisingly improve the surface structural stability of the cathode materials and improve capacity retention during charging and discharging processes.

The compounds of Formula (I) can be prepared in high purity and a high yield by reaction of a metal hexafluorophosphate with a bis-silyl malonate compound A similar oxalato compound, lithium tetrafluoro(oxalato)phosphate, can be made in the same manner, but using a bis-silyl oxalate in place of the bis-silyl malonate. Advantageously, the compounds of Formula (I) as well as lithium tetrafluoro(oxalato)phosphate, can be formed, in situ, in a $LiPF_6$-containing electrolyte solution.

Useful additive compounds can be formed in situ in $LiPF_6$ electrolyte solutions. For example, an electrolyte comprising a solution of the $LiPF_6$ in a non-aqueous organic solvent and an additive comprising a compound of Formula (V):

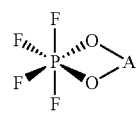

(V)

can be prepared in a convenient in situ process, which comprises the steps of adding a bis-silyloxy compound of Formula (VI):

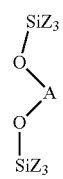

(VI)

to a electrolyte solution of the $LiPF_6$ in the non-aqueous organic solvent, and stirring the resulting mixture at ambient temperature for at least about 24 hours to form the compound of Formula (V) in situ; wherein each Z independently is alkyl; and A is an organic moiety in which the O atoms of Formulas (V) and (VI) are separated by two or three carbon atoms, and each of the O atoms is bound to either a carbonyl carbon or an aromatic carbon.

Non-limiting examples of A in Formulas (V) and (VI) include, e.g.

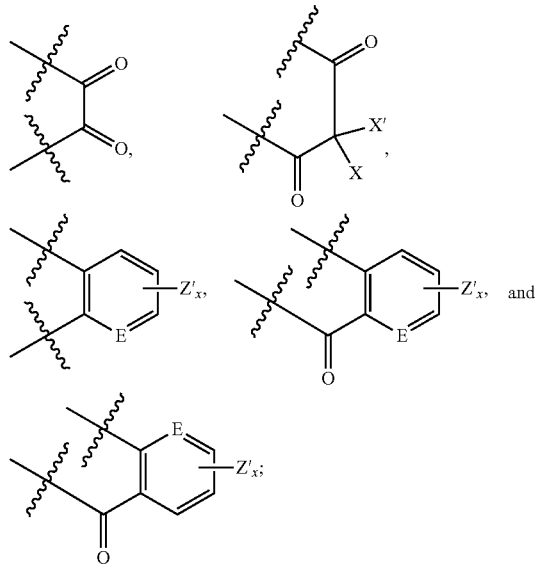

wherein X and X' are as defined above for Formulas (I), (II), and (III); E is CH or N; each Z' independently is a substituent replacing a hydrogen atom and is selected from the group consisting of alkyl (e.g., $C_1$ to $C_6$ alkyl), halogen (e.g., Cl or F), alkoxy (e.g., methoxy, ethoxy, and the like); and fluoro-substituted alkyl, x is 0, 1, 2, or 3 when E is N; and x is 0, 1, 2, 3, or 4, when E is CH. Of course, other Z' substituents maybe utilized (e.g., nitro, carboxyl, cyano, etc.), if desired. Similarly, other A groups can be utilized, so long as A is an organic moiety in which the O atoms of Formulas (V) and (VI) are separated by two or three carbon atoms, and each of the O atoms is bound to either a carbonyl carbon or an aromatic carbon, e.g., A can be a naphthyl compound, a quinoline compound, and the like, if desired.

In the Compounds of Formula (I), (II), and (III), X' and X" can be H, F, alkyl and fluoroalkyl, or X' and X" together can be an alkylene group. Non-limiting examples of alkyl groups include methyl, ethyl, propyl, butyl, isopropyl, tert-butyl, sec. butyl, isobutyl, pentyl, hexyl, and the like. The alkyl groups can be substituted by halogen, alkoxy, acyl, acyloxy, and the like). Fluoroalkyl groups include at least one F substituent. In some embodiments fluoroalkyl groups are perfluoroalkyl (i.e., all hydrogens replaced by F), such as trifluoromethyl and pentafluoroethyl.

As used herein the term "alkylene" refers to a bivalent saturated aliphatic radical (e.g., such as ethylene (—$CH_2CH_2$—), propylene (—$CH_2CH_2CH_2$—), substituted ethylene (e.g., substituted by F, fluoroalkyl, or alkyl), substituted propylene (e.g., substituted by F, fluoroalkyl, or alkyl), and the like), which is formally regarded as derived from an alkene by opening of the double bond or from an alkane by removal of two hydrogen atoms from different carbon atoms.

R, R', R", in the compounds of Formula (I), (II) and (III) are H, F, alkyl or fluoroalkyl, as described above with respect to X' and X".

The Z groups in Formula (II), (II) and (IV) preferably are alkyl, such as methyl, ethyl, tert-butyl, and the like. Preferably, the Z groups are methyl.

The electrolytes described herein comprise an electrolyte salt dissolved in a non-aqueous solvent. Non-limiting examples of such solvents include, e.g., one or more solvent selected from an ether, a carbonate ester (e.g., a dialkyl carbonate or a cyclic alkylene carbonate), a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds. A preferred mixture of solvents is a 3:7 weight ratio of EC:EMC, also known as Gen 2 solvent.

Non-limiting examples of lithium salts useful in the electrolyte compositions described herein include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiBOB), lithium difluoro (oxalato)borate (LiDFOB), lithium tetrafluoroborate (LiBF$_4$), lithium hexafluorophosphate (LiPF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, combinations of two or more thereof, and the like. In some preferred embodiments, the lithium salt comprises lithium nitrate in combination with at least one other salt, e.g., LiTFSI. Preferably, the lithium salt is selected from one or more of LiF$_2$BC$_2$O$_4$, LiPF$_6$, LiBF$_4$, LiB(C$_2$O$_4$)$_2$, LiClO$_4$, lithium bis(fluorosulfonyl)imidate (LiFSI), lithium bis(trifluoromethanesulfonyl)imidate (LiTFSi), and LiAsF$_6$. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between an anode and a cathode, and includes so-called full cells with an anode material (e.g., graphite) that can accommodate intercalated lithium ions, as well as so-called half-cells in which the anode is lithium metal. In some embodiments, the lithium salt is present in the electrolyte at a concentration in the range of about 0.1 M to about 3 M, e.g., about 0.5 M to 2 M, or 1 M to 1.5M. A preferred lithium salt is LiPF$_6$.

The electrolyte compositions described herein also can optionally comprise an additional additive such as those described in Jow et al. (Eds.), *Electrolytes for Lithium and Lithium-ion Batteries*; Chapter 3, pp. 167-182, Springer; New York, N.Y. (2014), which is incorporated herein by reference in its entirety. Such additives can provide, e.g., benefits such as SEI, cathode protection, Li salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additive is present in the electrolyte at a concentration in the range of about 0.001 M to about 0.25 M, or about 0.01 M to about 0.1 M.

The electrolytes can be incorporated in a lithium-ion electrochemical cell comprising a positive electrode (cathode), a negative electrode (anode), and a porous separator between the cathode and anode, with the electrolyte in contact with both the anode and cathode, as is well known in the battery art. A battery can be formed by electrically connecting two or more such electrochemical cells in series, parallel, or a combination of series and parallel. The electrolyte can be utilized with any anode or cathode compositions useful in lithium-ion batteries. Electrochemical cell and battery designs and configurations, anode and cathode materials, as well as electrolyte salts, solvents and other battery or electrode components (e.g., separator membranes, current collectors), which can be used in the electrolytes, cells and batteries described herein, are well known in the lithium battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

Processes used for manufacturing lithium cells and batteries are well known in the art. The active electrode materials are coated on both sides of metal foil current collectors (typically copper for the anode and aluminum for the cathode) with suitable binders such as polyvinylidene difluoride and the like to aid in adhering the active materials to the current collectors. The anode active material typically is a carbon material such as graphite, and the cathode active material typically is a lithium metal oxide material. Cell assembly typically is carried out on automated equipment. The first stage in the assembly process is to sandwich a separator between the anode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed the cell must be subjected to at least one controlled charge/discharge cycle to activate the electrode materials and form a solid electrolyte interface (SEI) layer on the anode. This is known as formation cycling. The formation cycling process is well known in the battery art and involves initially charging with a low voltage (e.g., substantially lower that the full-cell voltage) and gradually building up the voltage. The SEI acts as a passivating layer which is essential for moderating the charging process under normal use. The formation cycling can be carried out, for example, according to the procedure described in Long et al. J. Electrochem. Soc., 2016; 163 (14): A2999-A3009, which is incorporated herein by reference in its entirety. This procedure involves a 1.5 V tap charge for 15 minutes at C/3 current limit, followed by a 6 hour rest period, and then 4 cycles at C/10 current limit, with a current cutoff (i≤0.05 C) at the top of each charge.

The additives of described herein, such as compounds of Formula (I), can be utilized with any combination of anode and cathode in any type of rechargeable battery system that utilizes a non-aqueous electrolyte. The additives can be utilized in any rechargeable lithium battery system with a graphite or silicon-based anode and any lithium metal oxide cathode material or other cathode active material used in lithium-ion batteries. In some embodiments, the cathode can comprise a layered lithium metal oxide cathode material such as $LiMO_2$ wherein M=Mn, Ni, Co or a combination thereof (e.g., a layered lithium nickel-manganese-cobalt oxide, often referred to as "NMC", such as $Ni_{0.5}Mn_{0.3}Co_{0.2}O_2$ (also known as "NMC532"), and similar materials). In other embodiments, the cathode can comprise a spinel lithium metal oxide such as $Li_2M'_2O_4$ wherein M'=Mn, Ni, Co or a combination thereof; a structurally integrated 'layered-layered' (LL) lithium metal oxide such as $xLi_2MnO_3 \cdot (1-x)LiMn_yM_{1-y}O_2$ wherein $0<x<1$, $0 \le y \le 1$, M=Ni, Co, or Ni and Co; a structurally integrated 'layered-spinel' (LS) lithium metal oxide such as $xLi_2MnO_3 \cdot (1-x)Li_2Mn_yM_{2-y}O_4$ wherein $0<x<1$, $0 \le y \le 2$, M=Ni, Co, or Ni and Co; a structurally integrated 'layered-layered-spinel' (LLS) lithium metal oxide such as $z[xLi_2MnO_3 \cdot Li_2Mn_yM_{2-y}O_4] \cdot (1-z)Li_2M'_2O_4$ wherein $0<x<1$, $0 \le y \le 1$, $0<z<1$, M=Ni, Co, or Ni and Co, and M'=Mn, Ni, Co or a combination thereof (e.g., $0.85[0.25Li_2MnO_3 \cdot (0.75)LiMn_{0.375}Ni_{0.375}Co_{0.25}O_2] \cdot 0.15Li_2M'_2O_4$ wherein M'=a combination of Mn, Ni, and Co); or any other cathode active material used in lithium-ion batteries.

As used herein, a structurally-integrated composite metal oxide is a material that includes domains (e.g., locally ordered, nano-sized or micro-sized domains) indicative of different metal oxide compositions having different crystalline forms (e.g., layered or spinel forms) within a single particle of the composite metal oxide, in which the domains share substantially the same oxygen lattice and differ from each other by the elemental and spatial distribution of metal ions in the overall metal oxide structure. Structurally-integrated composite metal oxides are different from and generally have different properties than mere mixtures of two or more metal oxide components (for example, mere mixtures do not share a common oxygen lattice).

The following non-limiting Examples are provided to illustrate certain features and aspects of the compositions and methods described herein.

Experimental

All electrodes utilized herein were obtained from the Argonne National Laboratory Cell Analysis, Modeling and Prototyping (CAMP) facility. The positive electrode of each coin cell was composed of 90.0 wt % $Li_{1.03}(Ni_{0.5}Mn_{0.3}Co_{0.2})_{0.97}O_2$ (NMC532; from TODA), 5.0 wt % 5130 PVdF binder (from Solvay,) and 5.0 wt % C45 carbon black (from Timcal) coated on an aluminum current collector. The loading density of the positive electrode active material was 9.17 mg/cm$^2$. The negative electrode of each coin cell was composed of 91.8 wt % A12 graphite (from ConocoPhillips), 6.0 wt % 9300 PVdF binder (from Kureha) and 2.0 wt % C45 carbon black (Timcal) coated on a copper current collector. The loading density of the negative electrode was 5.88 mg/cm$^2$. The separator used in each coin cell assembly was a CELGARD 2325 (PP/PE/PP). The "baseline" electrolyte used was composed of 1.2 M $LiPF_6$ in ethylene carbonate/ethyl methyl carbonate (EC/EMC) (3:7 w/w) (commonly referred to as "Gen 2" electrolyte; from Tomiyama Chemical Industry, Japan).

Electrochemistry

All electrochemical data were collected on MACCOR cyclers using 2032-type coin cells and the positive electrode, negative electrode and separator were 14, 15 and 16 mm in diameter, respectively. All electrodes used were dried at 100° C. prior to use in an Ar-filled glovebox and all coin cells were assembled in an argon-atmosphere under constant-temperature (30° C.). Galvanostatic charge/discharge cycling was conducted between 3.0-4.4 V using the following outlined protocol (for a more detailed analysis of the protocol see: Abraham, D. P.; Dees, D. W.; Christophersen, J.; Ho, C.; Jansen, A. N, Performance of high-power lithium-ion cells under pulse discharge and charge conditions, *Int. J Energ Res* 2010, 34 (2), 190-203). Five "formation" cycles at a C/10 rate were followed by "aging" cycles at a C/3 rate, which included a 3 hour constant voltage hold at 4.4 V. Hybrid pulse power characterization (HPPC) tests were performed periodically throughout the aging cycles from which area specific impedance (ASI) measurements were calculated by methods known in the LIB art. The electrochemistry data shown comprise the average of 3 individually cycled coin cells.

Example 1. Syntheses of Compounds 1a, 1b, 2a and 2b

Compounds 1a and 1b were synthesized according to previous literature procedures. Liao, C.; Han, K. S, Baggetto, L.; Hillesheim, D. A., Custelcean, R.; Lee, E.-S.; Guo, B.; Bi, Z.; Jiang, D.-e.; Veith, G. M.; Hagaman, E. W.; Brown, G. M.; Bridges, C.; Paranthaman, M. P.; Manthiram, A.; Dai, S., Sun, X.-G., Synthesis and Characterization of Lithium Bis(fluoromalonato)borate for Lithium-Ion Battery Applications, *Adv. Energy Mater.* 2014, 4, 1301368/1-1301368/12; Wan, S.; Jiang, X, Guo, B, Dai, S.; Goodenough, J. B.; Sun, X.-G., A stable fluorinated and alkylated lithium malonatoborate salt for lithium ion battery application, *Chemical Communications* 2015, 51 (48), 9817-9820. Briefly, 3-(trimethylsilyl)-2-oxazolidinone was reacted with either oxalic acid or 2-fluoro-2-methyl malonic acid to form Compounds 1a and 1b, respectively. The reactions were promoted by the precipitation of 2-oxazolidinone byproduct.

To analyze the reaction between Compound 1a or 1b with $LiPF_6$, NMR spectra were recorded on a BRUKER AVANCE III 300 NMR (300 MHz, $^1H$; 282.3 MHz, $^{19}F$; 121.4 MHz, $^{31}P$) spectrometer. All measurements were performed at 300 K. Chemical shifts (δ) were reported in parts per million (ppm) relative to tetramethylsilane (TMS) or residual protiated solvent peak in $^1H$ NMR spectra. The coupling constants (J) between different nuclei were given in hertz (Hz) To prepare the samples for NMR measurements in NMR, a previous method by Qi et al. was used: Qi, X.; Tao, L.; Hahn, H.; Schultz, C.; Gallus, D. R.; Cao, X.; Nowak, S, Roser, S, Li, J., Cekic-Laskovic, L.; Hahn, B. R.; Winter, M., Lifetime limit of tris(trimethylsilyl) phosphite as electrolyte additive for high voltage lithium ion batteries, *RSC Advances* 2016, 6 (44), 38342-38349. Fluorinated ethylene propylene (FEP) NMR liners (3 mm diameter, from Wilmad/VWR) were used to avoid any direct contact between the electrolytes with NMR glass tubes since potential reaction between HF and glass would introduce side reactions and impurities. The FEP tubes was carefully packed with samples and capped with a polytetrafluoroethylene (PTFE) plug and placed in a glass NMR tube (0.5 mm) containing either $CD_3CN$ or $C_2D_6O$.

Synthesis of Compound 2a: $LiPF_6$ (one equivalent) and bis(trimethylsilyl) oxalate (two equivalents) were mixed in battery grade dimethyl carbonate and stirred in Ar-filled glove box for 48 hours (h). The solvent was then removed by evaporation in glovebox for 48 h NMR characterization was carried out as previously reported. $^{19}F$ NMR ($CD_3CN$, 282.3 MHz), δ PPM: −60.3 (dt, 2F, $^2J_{FF(ax-eq)}$=783.7, $^2J_{FF(ax-ax')}$=52.1), −77.342 (dt, 2F, $^2J_{FF(ax'-eq)}$=754.1, $^2J_{FF(ax-ax')}$=53.1), $^{31}P$ NMR ($CD_3CN$, 121.4 MHz) δ PPM:), −142 (tt, $^1J_{P-F(ax)}$=783.7 $^2J_{P-F(eq)}$=754.2).

Synthesis of Compound 2b: $LiPF_6$ (one equivalent) and bis(trimethylsilyl)-fluoro-2-methylmalonate (two equivalents) was mixed in battery grade dimethyl carbonate and stirred in Ar-filled glove box for 48 h. The solvent was then removed by evaporation in glovebox for 48 h. NMR characterization was carried out as previously reported. $^1H$ NMR ($CD_3CN$, 300 MHz), δ PPM: 1.00 (d, 3H, $^2J_{HF}$=22.97). $^{19}F$ NMR ($CD_3CN$, 282.3 MHz), δ PPM: −52.14 (dt, 1F, $^2J_{FF(ax-eq)}$=786.8, $^2J_{FF(ax-ax')}$=50.1), −58.19 (dt, 1F, $^2J_{FF(ax'-eq)}$=768.4, $^2J_{FF(ax-ax')}$=51.1), −70.78 (dt, 2F, $^2J_{FF(ax-eq)}$=736.7, $^2J_{FF(ax-a'x)}$=51.1), −156.07 (dd, q, $^3J_{FH}$=22). $^{31}P$ NMR ($CD_3CN$, 121.4 MHz) δ PPM:), −156.07 (ddtd, 1F, $^1J_{P-F(ax)}$=783.7 $^1J_{P-F(ax)}$=768.9 $^1J_{P-F(eq)}$=, 737.5 $^4J_{FP}$=6).

In situ preparation of Compounds 2a and 2b: About 1 wt % of Compound 1a or 1b was added to 1.2 M $LiPF_6$ in EC/EMC (also known as "Gen 2" electrolyte; from Tomiyama) in a polypropylene NALGENE CRYOGENIC vial and the resulting mixture was stirred at room temperature for 3 days to form Compounds 2a and 2b, respectively. The progress of the reactions were monitored by drawing aliquots of the solutions to run NMR analyses.

Example 2. Electrochemical Performance

Capacity Retention and Energy Figure-of-Merit (FOME) provide methods of characterizing active lithium loss caused by parasitic reactions and sequestration in the SEI. The $1^{st}$ cycle capacity loss is directly related to the lithium trapping inside the SEI and is irrerversible (also referred to as Irreversible Capacity Loss, "ICL"). First cycle charge and discharge data for coin cells including three different concentrations (0.5, 1, and 2 wt %) of Compounds 2a and 2b are provided in Table 1, and plots of the cycling performance are provided in FIG. 1. The initial discharge of all the cells containing any of the additives was lower than that of the baseline cell (no additive), which is consistant with immoblization of the $Li^+$ during the SEI formation, and corroborates dQ/dV data discussed below. The $1^{st}$ irreversible cycle capacity loss increased as the additive wt % increased. Despite the slightly higher ICL compared to the base line, the capacity retention with addition of either 2a or 2b at 0.5 wt % and 1 wt % outperformed that of the Gen 2 baseline cell.

TABLE 1

The 1st cycle capacities (charge and discharge) and capacity loss for the various concentration of additives 2a and 2b in Gen 2 electrolytes

|  | 0.5% 2a | 1% 2a | 2% 2a | 0.5% 2b | 1% 2b | 2% 2b | Baseline |
|---|---|---|---|---|---|---|---|
| $1^{st}$ cycle charge capacity | 192.4 | 214 | 219.3 | 217.3 | 214.1 | 215.4 | 220 |
| $1^{st}$ cycle discharge capacity | 158.8 | 180.7 | 181.2 | 185.8 | 182.1 | 174.7 | 191 |
| $1^{st}$ cycle capacity loss (ICL) | 33.6 | 33.4 | 38.1 | 31.5 | 32 | 40.7 | 28.8 |
| $1^{st}$ cycle capacity loss in % | 17.5 | 15.6 | 17.3 | 14.5 | 14.9 | 18.9 | 13.1 |

Figure 2:
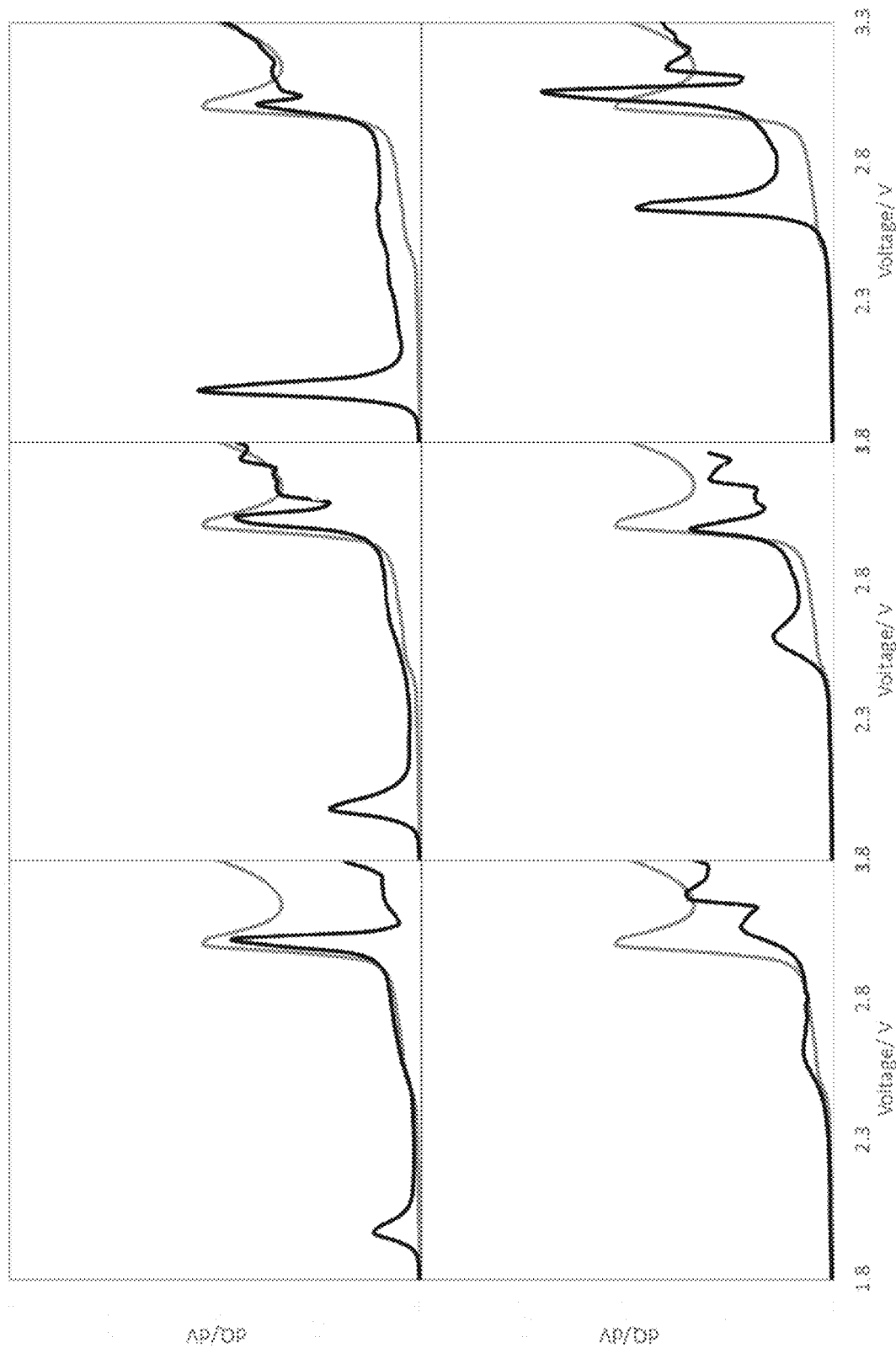
FIG. 2 provides plots of dQ/dV for various concentrations of Compounds 2a and 2b in Gen 2 electrolyte with NMC532 cathode and graphite anode, results for baseline Gen 2 electrolyte are shown by the grey curves.

The slightly higher ICLs and slightly lower initial capacity of the additives in Table 1 and FIG. 1 indicates more lithium loss in the presence of the additives. As discussed earlier, the lithium loss is due to trapping during the formation of SEI, which occurs during the 1$^{st}$ charge and discharge (mostly during charge). Differential capacity values (dQ % dV) were plotted against voltage during the 1$^{st}$ charge and discharge, as shown in FIG. 2. The dQ/dV of Gen 2 baseline was compared with the data for cells containing the additives to show the effect of adding compounds 2a and 2b to the electrolytes. In the plots, dQ/dV peaks are associated with redox reactions during the cycling, and an increase of the charge consumption (Li trapping) is clearly shown with increasing amount of both additives 2a and 2b. The Gen 2 baseline is characterized by a major peak at about 3.0 V due to ethylene carbonate reduction at 0.7 V vs Li/Li+. The data in FIG. 2 demonstrate that Compound 2a preferentially decomposed at about 2.0 V in the full NMC532 cell, and Compound 2b preferentially decomposed at about 2.6 V in the full cell. The lower redox potential required to reduce Compound 2b compared to 2a is likely due to the stabilizing effect of the F and CH$_3$ substitutents of Compound 2b and the reduced ring strain in the 6-member malonate-phosphorus ring of Compound 2b relative the 5-membered oxalate-phoshorus ring of Compound 2a. With addition of Compound 2b, an extra peak with at about 3.2 V (0.5 V vs Li/Li$^+$) was observed.

Specific impedance (ASI) changes as a function of cycle number were evaluated for the additives 2a and 2b at concentrations of 0.5-2 wt % compared to cells with baseling electrolyte. The initial ASI, final ASI, and ASI change values for the various electrolytes are provided in Table 2. The initial power density, final power density and the loss of power density are provided in Table 3. The power density was obtained using Eq. 1, the $V_{rest}$ and ASI were directly obtained from HPPC. For the calculation of the power density, the ASI value was extracted from the 2nd 2 C discharge pulse (around 4.08 V) during the cell discharge cycle (Eq. 1). The methodology by Bloom et al. was adapted for the measurement of the power density (Bloom, I.; Cole, B. W.; Sohn, J. J.; Jones, S. A.; Polzin, E. G.; Battaglia, V. S.; Henriksen, G. L.; Motloch, C.; Richardson, R.; Unkelhaeuser, T.; Ingersoll, D.; Case, H. L., An accelerated calendar and cycle life study of Li-ion cells. *Journal of Power Sources* 2001, 101 (2), 238-247).

$$P = \frac{3 \times (V_{rest} - 3)}{ASI} \times 1000 \qquad \text{Eq. 1}$$

The data in Table 2 and Table 3 demonstrate that the initial ASI of the baseline cell (24.0 Ωcm$^2$) is lower than the initial ASI of all the additive-containing cells. However, the ASI increase of the baseline (20.9 Ωcm$^2$) is larger than the increase for all the other cells. Both additives 2a and 2b, at all concentrations, displayed some ASI benefits. The ASI change decreased as the concentration of both additives 2a and 2b increased, suggesting a suppression effect of both additives toward ASI. Initial power density was also improved with 1 wt % of Compound 2b; however, both additives 2a and 2b, at all concentrations, displayed some benefit toward the percentage loss of power density, which was the greatest in the Gen 2 baseline cells

TABLE 2

Initial ASI, final ASI and ASI change in Ωcm$^2$ and ASI change for 2a and 2b in Gen 2 electrolytes with the following (%) additive combinations: 0.5 wt %, 1 wt % and 2 wt %.

|  | 0.5% 2a | 1% 2a | 2% 2a | 0.5% 2b | 1% 2b | 2% 2b | Baseline |
|---|---|---|---|---|---|---|---|
| Initial ASI | 31.2 | 26.2 | 25.1 | 27.4 | 23.8 | 30.6 | 24 |
| Final ASI | 45.8 | 33.2 | 31.3 | 44.1 | 36.8 | 35.1 | 44.9 |
| ASI change | 14.6 | 7 | 6.2 | 16.1 | 13 | 4.5 | 20.9 |
| ASI change in % | 46.8 | 26.7 | 24.7 | 58.8 | 54.6 | 14.7 | 87.1 |

TABLE 3

Initial power density (mWcm$^{-2}$), final power density (mWcm$^{-2}$), and loss after cycling (%). These values for the baseline electrolyte are 135 mWcm$^{-2}$ and 47.1%, respectively.

|  | 0.5% 2a | 1% 2a | 2% 2a | 0.5% 2b | 1% 2b | 2% 2b | Baseline |
|---|---|---|---|---|---|---|---|
| Initial power density | 106 | 128.4 | 133 | 124 | 141 | 109.2 | 135 |
| Final power density | 73.3 | 93.2 | 105.9 | 74 | 89.2 | 91.8 | 71.7 |
| Loss after cycling (%) | 30.9 | 35.2 | 20.4 | 40.3 | 36.7 | 15.9 | 47.1 |

Additives are believed to help the performance through different mechanism, including HF scavenging, formation of a better SEI on the anode side, and passivation film formation on the cathode side to prevent further oxidation and increase of impedance on the cathode side. To elucidate the mechanism of how the small sacrificial amount of additive works in the battery system, a systematic protocol consisting of both formation cycles and a potentiostatic hold was used. The formation cycle allows the additive to be reduced at the anode side for SEI formation. During the potentiostatic hold, the cathode was forced to stay at a voltage of 4.5 V. The electrolyte underwent oxidation, however, because of the charge neutrality of the solution, the electrolyte will be reduced at the anode side to keep solution from net charging and also keep the potential of the positive electrode at the same potential (i.e., no lithiation would occur on the cathode side). During the potentiostatic hold, the leakage current is a direct reflection of how oxidation occurs and whether there is passivation on the surface of the cathode. As a comparison, coin cells with Gen 2 baseline electrolyter were also subjected to the same protocol. A passivation film formation induced by the additive would be indicated by a lower leakage current that that of the Gen 2 baseline. Coin cells with both additives 2a and 2b exhibited lower leakage current than concells comprising the baseline electrolyte, confirming passivation film formation.

Example 3. Structural Characterization of the Additives

NMR analysis was used to characterize the additive structures obtained by in situ reaction of the bis-silyl oxalate (Ox(TMS)$_2$), Compound 1a, with PF$_6^-$ in DMC. To assist the identification of these anion species using $^{19}$F and $^{31}$P NMR, chemical shifts and spin-spin interaction (J) constants were calculated for geometry optimized structures using density functional theory (DFT). $^{19}$F and $^{31}$P NMR spectra of aged solutions in DMC (1:1 equiv. LiPF$_6$ and Ox(TMS)$_2$) show complicated patterns due to strong $^{31}$P-$^{19}$F and $^{19}$F-$^{19}$F coupling in the nuclear systems. After three days of aging, the main product of the reaction was determined to be the P(Ox)F$_4^-$ complex (Product A, i.e., a complex with one bidentate oxalate (Ox) ligand, which is readily recognized in the $^{19}$F NMR spectrum through the dt patterns in the axial and equatorial fluorine-19 nuclei at −60.3 ppm and −77.3 ppm, respectively, with ($^{19}$F$_{ax}$-$^{19}$F$_{eq}$) of approx. 52 Hz and J($^{31}$P-$^{19}$F) of 784 Hz and 754 Hz, respectively, and the corresponding tt pattern in the $^{31}$P NMR spectrum. This species accounted for about 95% of the original PF$_6^-$ anions, of which less than 5% remains in the solution. The yield of PO$_2$F$_2^-$ via hydrolysis of PF$_6^-$ by the residual moisture was negligible. In addition to this product, there is a minor product which shows a doublet in the $^{19}$F NMR spectrum (J($^{31}$P-$^{19}$F) of about 801 Hz), with chemical shift σ at −63.45 ppm) and a triplet in the $^{31}$P NMR spectrum suggesting that it is a PF$_2$ species (σ at 797.3 ppm, 1-3% yield). This was assigned as the axisymmetrical P(Ox)$_2$F$_2^-$ complex (Product B) having two bidentate oxalate (Ox) ligands. Apparently, a second substitution of fluoride ions for the bidentate ligand is rather inefficient, and no evidence was found for a third substitution (i.e., P(Ox)$_3$ anion with no F).

Having a molar excess of Ox(TMS)$_2$ (Compound 1a) relative to LiPF$_6$ can shift the equilibrium towards more extensive substitution. In addition to the 1:1 equiv solution of Ox(TMS)$_2$ relative to LiPF$_6$, 2:1 and 3:1 equiv. solutions were also examined. In these solutions, the PF$_6^-$ anions were almost completely consumed. When Ox(TMS)$_2$ is present at 3 times excess of LiPF$_6$, in addition to Products A and B, a trace amount of a new Product C was observed. The yield of Product C (<1%) was too small to detect using $^{31}$P NMR, but the axial and equatorial fluorine-19 nuclei (1.2 ratio in terms of integration of NMR peaks) with the dt and dd patterns respectively indicate a PF$_3$ species. As there are no complementary proton resonances from the TMS group from a monosubstituted anion, it is believed that Product C is the symmetrical bis-substituted species: F$_3$(C$_2$O$_4$)P—C(=O)—C(=O)—P(C$_2$O$_4$)F$_3$—, which agrees well with DFT calculations Neglecting this very minor product, the Product A:B ratio in both the 2, 1 and 3:1 these solutions was about 4,1, so even having a relatively large excess of Ox(TMS)$_2$ relative to LiPF$_6$ does not push these reactions all the way towards bidentate disubstitution. The same results were observed when this reaction was conducted at a higher temperature. Thus, while it is very easy to find experimental conditions for the reaction to yield the monosubstituted anion (Product A) in preference to other products, it proved difficult to find conditions that favor the formation of the disubstituted Product B.

In the reaction of Compound 1b (the 2-fluoro-2-methyl malonate bis-silyl ester) with LiPF$_6$, di- and tri-substitution reactions are prohibitive energetically, so that the monosubstituted malonate P(F-Me-Mal)F$_4^-$ anion (Product A-type structure) prevails, as well. In this anion (unlike for the analogous oxalate complex shown) the two axial fluorines are magnetically in equivalent With 10 wt % F-Me-Mal (TMS)$_2$ in Gen2 electrolyte (two week aging), the main species has the three fluorine-19 resonances (1:1:2) at −52.1, −58.2, and −70.8 ppm with the expected dt patterns and the corresponding ddtd pattern for the phosphorus-31 at −151.9 ppm. These resonance lines all originate from a PF$_4$ system with two in equivalent axial and two equivalent equatorial fluorines that correspond either to a monomer or a dimer PZF$_4^-$ anion. Importantly, the smallest coupling of about 6 Hz cannot be from this PF$_6$ subsystem, it can only originate from the F-Me-Mal ligand. In addition, there is a −156.1 ppm resonance from the CF*Me fluorine with a qdd pattern, which becomes a dd pattern when the protons are decoupled (so the quartet structure is from the methyl group). DFT calculations suggest that for this fluorine, the coupling to $^{19}$F$_{eq}$ is negligible, whereas the coupling to $^{31}$P and $^{19}$F$_{ax'}$ is estimated to be 10.4 Hz and 5.9 Hz, respectively. The dd pattern in this fluorine corresponds to J-couplings of 5.7 Hz and 2.2 Hz, respectively. The first one of these constants is close to about 6 Hz coupling in the phosphorus-31, which means that the 2.2 Hz coupling is from the axial fluorine. To further probe the structure of this product, $^{13}$C NMR spectra were examined with and without proton decoupling. Strong J($^{13}$C-$^{19}$F) coupling of 20-25 Hz was found between the carboxyl and methyl carbons and the CFMe fluorine; in addition, the methyl carbon was coupled to a single fluorine (about 8 Hz), which is clearly $^{19}$F$_{ax}$. The C*FMe carbon is also coupled to this axial fluorine-19 nucleus (5.2 Hz); both of these spin-spin couplings in the bidentate ligand are consistent with DFT calculations. Based on this information, the F-Me-Mal was identified as Compound 2b with the following structure in which the bidentate malonate is equatorially oriented, and the two axial fluorine atoms are in different magnetic environments, e.g., due to through-space shielding of one axial fluorine by the methyl group of the malonate:

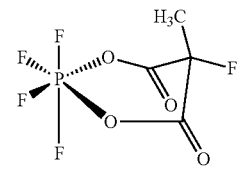

In this experiment, Compound 2b and PF$_6^-$ were in the approximate 1:2 mole ratio. Shortly after the initiation of the reaction, resonance lines from fluorine-19 in species other than Compound 2b were observed. As the solution aged, a dquin line from the axial fluorine-19 nuclei this product is observed at −79.2 ppm, indicating a PF$_5$ species with four equivalent equatorial fluorines, but at all stages of solution aging, the yield of this species was <5%. Based on the various NMR data, this minor product is believed to be the monosubstituted anion shown below (Compound 3). Indeed, in the proton NMR, a CFMe methyl is observed upfield of Compound 2b (0.95 vs 1.09 ppm) with the similar J($^1$H-$^{19}$F) coupling (21.6 vs 22.8 Hz), which is consistent with the monosubstituted anion, and there is a complementary resonance line from the TMS group upfield of the parent F-Me-Mal(TMS)$_2$ compound (−0.44 ppm vs. −0.55 ppm).

Once again, the effect of the reagent concentration on this substitution reaction was explored. When a 1:1 equiv mixture was used, after two days the mole ratios between products 2b, 3 and PF$_6^-$ was about 1:0.23:1.2, and a fourth species was observed through the weak dt resonance from the equatorial fluorine-19 at −73 ppm. After further aging, other minor species (C and D) were observed, as well, so that after prolonged aging (20 days) the mole ratio 2b:3:C:D:PF$_6^-$ between these species was about 1.7:0 13:0.04: 0.04:1 When a 3:1 equiv. mixture of Compound 1b to LiPF$_6$ was used, after two days of aging only Compound 2b and Compound 3 were observed, and the mole ratio of 2b.3. $PF_6^-$ was about 0.4:0.2:1. Therefore, instead of promoting further bidentate substitution, increasing the relative concentration of Compound 1b over $LiPF_6$ only increased the yield of Compound 3 relative to Compound 2b, and also introduced the other minor products.

Example 4. Exemplary Electrochemical Cell and Battery

Figure 3:
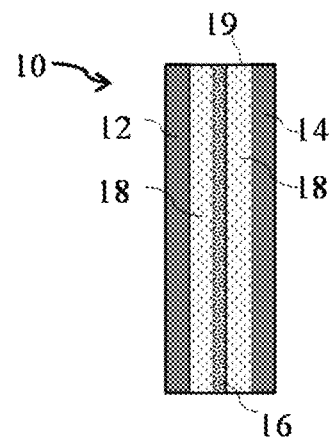
FIG. 3 schematically illustrates an electrochemical cell.
Figure 4:
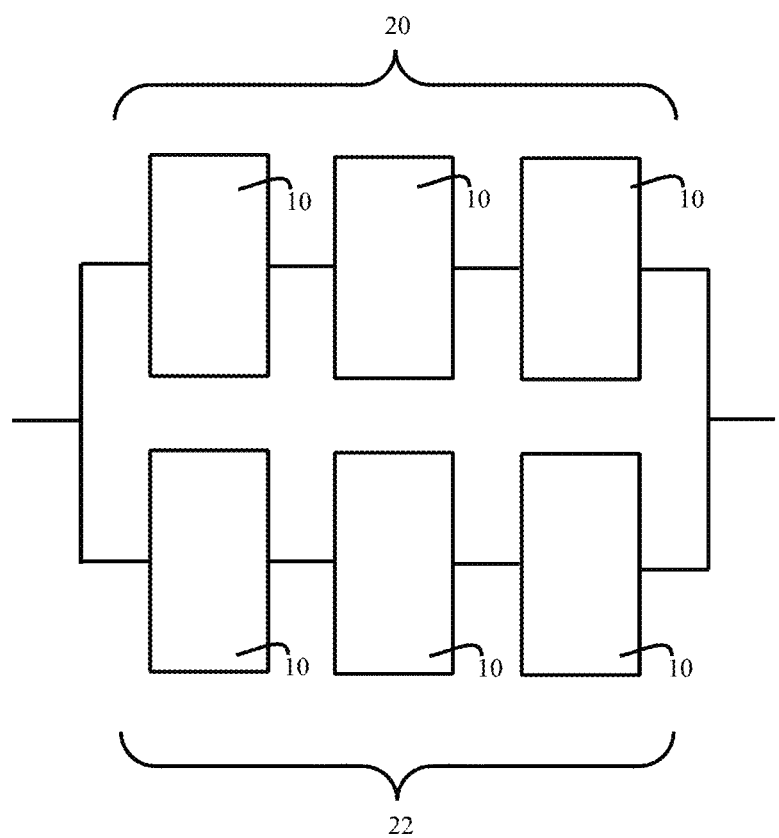
FIG. 4 schematically illustrates a battery comprising a plurality of an electrochemical cells electrically connected together.

FIG. 3 schematically illustrates a cross-sectional view of Li-ion electrochemical cell comprising cathode 12 (e.g., comprising metallic or carbon current collector coated with a material capable of reversibly accepting and releasing lithium ions, such as an NMC compound), and anode 14 (e.g., graphite), with a porous separator 16 (e.g., a polypropylene microporous separator, a polyethylene/polypropylene % polyethylene microporous separator, a polyethylene microporous separator; a poly(vinylidene-difluoride)-polyacrylonitrile graft copolymer microporous separator; and the like) between cathode 12 and anode 14. Electrolyte 18, comprising a lithium electrolyte salt (e.g., $LiPF_6$) and an additive of Formula (I) in a non-aqueous solvent contacts electrodes 12 and 14 and separator 16. Optionally, the cathode can comprise a particulate carbon material (e.g., graphite or carbon black) intermixed with the material capable of reversibly accepting and releasing lithium ions in a binder compound, such as poly(vinylidene difluoride). The electrodes, separator and electrolyte are sealed within housing 19. FIG. 4 schematically illustrates a lithium-ion battery comprising a first array 20 consisting of three series-connected electrochemical cells 10, and a second array 22 consisting of three series-connected electrochemical cells 10, in which first array 20 is electrically connected to second array 22 in parallel.

Each reference, including publications, patent applications, and patents, cited herein is hereby incorporated by reference to the same extent as if the reference was individually and specifically indicated to be incorporated by reference and was set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing an electrolyte comprising $MPF_6$ and a salt of Formula (I) in a non-aqueous organic solvent; the method comprising adding a bis-silyl ester compound of Formula (II) to a solution of the $MPF_6$ in the non-aqueous organic solvent, and stirring the resulting mixture at ambient temperature for at least about 24 hours to form the salt of Formula (I), in situ;

wherein:
Formula (I) is $MPF_4[-O(C=O)-(CX'X'')-(C=O)O-]$;
Formula (II) is $Z_3Si-(C=O)-(CX'X'')-(C=O)O-SiZ_3$;
M is Li or Na;
each X' and X" independently is selected from the group consisting of H, $C_1$ to $C_4$ alkyl, fluoro-substituted $C_1$ to $C_4$ alkyl, and F; or wherein the X' and X" together are an alkylene group of formula: $-CR_2-(CR'_2)_m-CR''_2-$,
each R, R' and R" independently is selected from the group consisting of H, methyl, trifluoromethyl, and F, in is 0 or 1, and
each Z independently is $C_1$ to $C_4$ alkyl.

2. The method of claim 1, wherein the non-aqueous organic solvent comprises at least one organic carbonate solvent.

3. The method of claim 1, wherein at least one of X' and X" is F.

4. The method of claim 1, wherein at least one of X' and X" is $C_1$ to $C_4$ alkyl.

5. The method of claim 1, wherein X' is F and X" is methyl.

6. The method of claim 1, wherein the compound of Formula (I) is formed in the electrolyte at a concentration in the range of about 0.5 to about 2 wt %.

7. The method of claim 1, wherein the X' and X" together are an alkylene group of formula: $-CR_2-(CR'_2)_m-CR''_2-$; and each R, R' and R" independently is selected from the group consisting of H and F.

8. The method of claim 1, M is Li.

9. The method of claim 1, wherein each Z is methyl.

10. The method of claim 1, wherein byproduct $FSiZ_3$ that is formed by the reaction of the $MPF_6$ with the compound of Formula (II) is retained in the electrolyte.

11. The method of claim 1, wherein byproduct $FSiZ_3$ that is formed by the reaction of the $MPF_6$ with the compound of Formula (II) is removed from the electrolyte by volatilizing the $FSiZ_3$.

12. A method of preparing an electrolyte comprising $MPF_6$ and an additive comprising a compound of Formula (V) in a non-aqueous organic solvent:

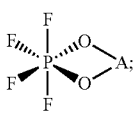
(V)

the method comprising the steps of adding a bis-silyloxy compound of Formula (VI):

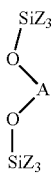
(VI)

to a solution of the $MPF_h$ in the non-aqueous organic solvent, and stirring the resulting mixture at ambient temperature for at least about 24 hours to form the compound of Formula (V) in situ;
wherein:
M is Li or Na;
each Z independently is $C_1$ to $C_4$ alkyl; and
A is

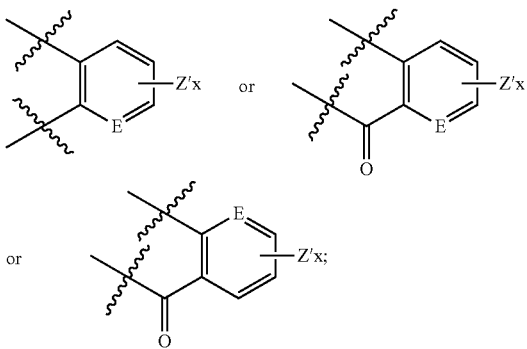

wherein:
E is CH or N;
each Z' independently is a substituent replacing a hydrogen atom and is selected from the group consisting of $C_1$ to $C_4$ alkylm halogen, alkoxy; and fluoro-substituted $C_1$ to $C_4$ alkyl;
x is 0, 1, 2, or 3 when E is N; and
x is 0, 1, 3, or 4, when E is CH.

13. The method of claim 12, wherein each Z is methyl.

14. The method of claim 12, wherein M is Li.

15. The method of claim 12, wherein A is

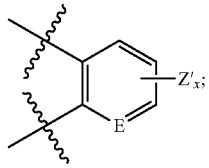

wherein:
E is CH or N;
each Z' independently is a substituent replacing a hydrogen atom and is selected from the group consisting of $C_1$ to $C_4$ alkyl, halogen, alkoxy; and fluoro-substituted $C_1$ $C_4$ alkyl;
x is 0, 1, 2, or 3 when E is N; and
x is 0, 1, 2, 3, or 4, when E is CH.

16. The method of claim 12, wherein A is

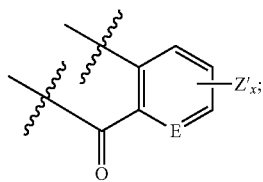

wherein:
E is CH or N;
each Z' independently is a substituent replacing a hydrogen atom and is selected from the group consisting of $C_1$ to $C_4$ alkyl, halogen, alkoxy; and fluoro-substituted $C_1$ to $C_4$ alkyl;
x is 0, 1, 2, or 3 when E is N; and
x is 0, 1, 2, 3, or 4, when E is CH.

17. The method of claim 12, wherein A is

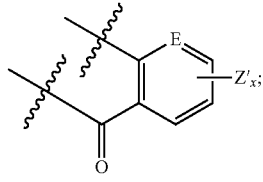

wherein:
E is CH or N;
each Z' independently is a substituent replacing a hydrogen atom and is selected from the group consisting of $C_1$ to $C_4$ alkyl, halogen, alkoxy; and fluoro-substituted $C_1$ to $C_4$ alkyl;
x is 0, 1, 2, or 3 when E is N; and
x is 0, 1, 2, 3, or 4, when E is CH.

18. The method of claim 12, wherein byproduct $FSiZ_3$ that is formed by the reaction of the $MPF_6$ with the compound of Formula (VI) is retained in the electrolyte.

19. The method of claim 12, wherein byproduct $FSiZ_3$ that is formed by the reaction of the $MPF_6$ with the compound of Formula (VI) is removed from the electrolyte by volatilizing the $FSiZ_3$.

* * * * *

UNITED STATES PATENT AND TRADEMARK OFFICE
CERTIFICATE OF CORRECTION

PATENT NO. : 11,695,156 B2
APPLICATION NO. : 17/074311
DATED : July 4, 2023
INVENTOR(S) : Chen Liao et al.

It is certified that error appears in the above-identified patent and that said Letters Patent is hereby corrected as shown below:

In the Claims

Claim 1, Column 18, Line 40, delete "$Z_3Si\text{-}(C\text{=}O)$" and insert --$Z_3Si\text{-}O(C\text{=}O)$--.
Column 18, Line 50, delete "in is 0 or 1" and insert --m is 0 or 1--.

Claim 12, Column 19, Line 34, delete "$MPF_h$" and insert --$MPF_6$--.
Column 19, Line 62, delete "alkylm" and insert --alkyl,--.
Column 19, Line 65, delete "1, 3," and insert --1, 2, 3,--.

Claim 15, Column 20, Line 18, delete "$C_1$ $C_4$" and insert --$C_1$ to $C_4$--.

Signed and Sealed this
Fifteenth Day of August, 2023

*Katherine Kelly Vidal*

Katherine Kelly Vidal
*Director of the United States Patent and Trademark Office*